United States Patent
Daley

(10) Patent No.: US 9,478,198 B1
(45) Date of Patent: Oct. 25, 2016

(54) RECESSED CONCAVE FINGERBOARD

(71) Applicant: Brian H. Daley, Fort Erie (CA)

(72) Inventor: Brian H. Daley, Fort Erie (CA)

( * ) Notice: Subject to any disclaimer, the term of this patent is extended or adjusted under 35 U.S.C. 154(b) by 0 days.

(21) Appl. No.: 14/743,502

(22) Filed: Jun. 18, 2015

(51) Int. Cl.
*G10D 3/06* (2006.01)
*G10D 1/08* (2006.01)
*G09B 15/06* (2006.01)

(52) U.S. Cl.
CPC ............... *G10D 3/06* (2013.01); *G09B 15/06* (2013.01); *G10D 1/08* (2013.01); *G10D 1/085* (2013.01)

(58) Field of Classification Search
CPC ................................. G10D 3/06; G09B 15/06
USPC .............................. 84/314 R, 291, 293, 267
See application file for complete search history.

(56) References Cited

U.S. PATENT DOCUMENTS

| | | |
|---|---|---|
| 281,584 A | 7/1883 | Haagen |
| 463,954 A | 11/1891 | Middlebrooke |
| 496,397 A | 5/1893 | Clopton |
| 501,743 A | 7/1893 | Stratton |
| 516,717 A | 3/1894 | Anderberg |
| 538,205 A | 4/1895 | Back |
| 549,966 A | 11/1895 | Hutchins |
| 554,828 A | 2/1896 | Maldura |
| 647,173 A | 4/1900 | Almcrantz |
| 967,507 A | 8/1910 | Finney |
| 973,719 A | 10/1910 | Consoli |
| 977,127 A | 11/1910 | Bengebt et al. |
| 1,022,031 A | 4/1912 | Larson |
| 1,188,983 A | 6/1916 | Nonfri |
| 1,259,062 A | 3/1918 | Wilber |
| 1,290,177 A | 1/1919 | Grimson |
| 1,365,839 A | 1/1921 | McHugh et al. |
| 1,446,758 A | 2/1923 | McHugh |
| 1,472,943 A | 11/1923 | Shaeffer |
| 1,571,118 A | 1/1926 | Hattie |
| 1,596,763 A | 8/1926 | Place, Jr. |
| 1,652,627 A | 12/1927 | Jerome |
| 1,692,207 A | 11/1928 | Hall |
| 1,727,230 A | 9/1929 | Cox |
| 1,727,620 A | 9/1929 | Smith |
| 1,803,100 A | 4/1931 | Dopyera |
| 1,808,756 A | 6/1931 | Beauchamp |
| 1,828,315 A | 10/1931 | Cavicchioli |
| 1,872,633 A | 8/1932 | Dopyera |
| 1,889,408 A | 11/1932 | Larson |
| 1,991,864 A | 2/1935 | Nopola et al. |
| 2,056,474 A | 10/1936 | Low |
| 2,100,249 A | 11/1937 | Hart |
| 2,101,364 A | 12/1937 | Dopyera |
| 2,148,589 A | 2/1939 | Stathopoulo |
| 2,261,357 A | 11/1941 | Fuller |
| 2,460,943 A | 2/1949 | Nelson |

(Continued)

FOREIGN PATENT DOCUMENTS

FR 2590711 A1 * 5/1987 ............... G10D 3/06

*Primary Examiner* — David Warren
*Assistant Examiner* — Christina Schreiber
(74) *Attorney, Agent, or Firm* — Brian B. Shaw, Esq.; Harter Secrest & Emery LLP

(57) ABSTRACT

A musical instrument having a plurality of strings is provided, the strings extending along a longitudinal dimension. The instrument includes a concave fingerboard extending along the longitudinal dimension and spaced from the plurality of strings to define the action, wherein a portion of the concave fingerboard is below an adjacent surface of a body of the musical instrument.

12 Claims, 12 Drawing Sheets

(56) References Cited

U.S. PATENT DOCUMENTS

| | | | | |
|---|---|---|---|---|
| 2,469,582 | A | 5/1949 | Strong | |
| 2,478,136 | A | 8/1949 | Stromberg | |
| 2,497,116 | A | 2/1950 | Dopyera | |
| 2,561,551 | A | 7/1951 | Allen | |
| 2,565,253 | A | 8/1951 | Melita | |
| 2,597,154 | A | 5/1952 | Maccaferri | |
| 2,664,022 | A | 12/1953 | Maccaferri | |
| 2,714,326 | A | 8/1955 | McCarty | |
| 2,740,313 | A | 4/1956 | McCarty | |
| 2,741,146 | A | 4/1956 | Fender | |
| 2,795,988 | A | 6/1957 | Maccaferri | |
| 2,816,469 | A | 12/1957 | Gossom | |
| 2,905,042 | A | 9/1959 | Hoyer | |
| 2,918,837 | A | 12/1959 | Webster | |
| 2,972,923 | A | 2/1961 | Fender | |
| 2,977,835 | A | 4/1961 | Hornseth | |
| 2,998,742 | A | 9/1961 | Pratt | |
| 3,069,954 | A | 12/1962 | Lover et al. | |
| 3,072,007 | A | 1/1963 | Burke | |
| 3,143,028 | A * | 8/1964 | Fender | G10D 3/06 84/293 |
| 3,178,985 | A | 4/1965 | Jeranson | |
| 3,194,870 | A | 7/1965 | Tondreau et al. | |
| 3,204,510 | A | 9/1965 | Hopf | |
| 3,241,418 | A | 3/1966 | Fender | |
| 3,244,054 | A | 4/1966 | Berglund | |
| 3,251,257 | A | 5/1966 | Bunker | |
| 3,273,439 | A | 9/1966 | Keefe et al. | |
| 3,324,755 | A | 6/1967 | Canonico | |
| 3,392,618 | A | 7/1968 | Pelensky | |
| 3,396,284 | A | 8/1968 | Scherer | |
| 3,403,590 | A | 10/1968 | Quinton | |
| 3,413,883 | A | 12/1968 | Melbourne | |
| 3,416,399 | A | 12/1968 | Baldoni | |
| 3,417,646 | A | 12/1968 | Cookerly et al. | |
| 3,418,876 | A | 12/1968 | Dopyera | |
| 3,427,916 | A | 2/1969 | Fender | |
| 3,429,214 | A | 2/1969 | Jones, Sr. | |
| 3,439,570 | A | 4/1969 | Lee | |
| 3,440,921 | A | 4/1969 | McCarty | |
| 3,443,018 | A | 5/1969 | Krebs | |
| 3,457,821 | A | 7/1969 | McCarty et al. | |
| 3,469,489 | A | 9/1969 | Barth | |
| 3,474,697 | A | 10/1969 | Kaman | |
| 3,478,631 | A * | 11/1969 | Fisher | G10D 3/06 84/293 |
| 3,481,238 | A | 12/1969 | Veres | |
| 3,530,226 | A | 9/1970 | Wheeler et al. | |
| 3,564,964 | A * | 2/1971 | Veres | G10D 3/06 84/291 |
| 3,605,545 | A | 9/1971 | Rendell | |
| 3,696,700 | A | 10/1972 | Berardi | |
| 3,712,952 | A | 1/1973 | Terlinde | |
| 3,785,239 | A | 1/1974 | Smith | |
| 3,787,600 | A | 1/1974 | Muncy | |
| 3,805,663 | A | 4/1974 | Okugawa | |
| 3,911,778 | A | 10/1975 | Martin | |
| 4,023,460 | A * | 5/1977 | Kuhnke | G10G 1/02 84/314 R |
| 4,031,799 | A | 6/1977 | Fender | |
| 4,064,780 | A | 12/1977 | Bond | |
| 4,073,211 | A * | 2/1978 | Jorgensen | G10D 3/06 84/267 |
| 4,074,606 | A | 2/1978 | Fender | |
| 4,084,476 | A | 4/1978 | Rickard | |
| 4,121,492 | A | 10/1978 | Berardi et al. | |
| 4,160,401 | A * | 7/1979 | Tomioka | G10D 3/14 84/298 |
| 4,172,405 | A | 10/1979 | Kaman, II | |
| 4,221,151 | A | 9/1980 | Barth | |
| 4,281,576 | A | 8/1981 | Fender | |
| 4,291,607 | A | 9/1981 | Kauffman | |
| 4,297,936 | A | 11/1981 | Mouton | |
| 4,304,165 | A * | 12/1981 | Gould | G10D 3/043 84/318 |
| 4,313,362 | A | 2/1982 | Lieber | |
| 4,359,924 | A * | 11/1982 | Brunet | G10D 3/06 84/293 |
| 4,361,068 | A | 11/1982 | Schaller | |
| 4,534,260 | A | 8/1985 | Burrell | |
| 4,681,009 | A | 7/1987 | Mouradian | |
| 4,777,858 | A | 10/1988 | Petschulat et al. | |
| 4,791,848 | A | 12/1988 | Blum, Jr. | |
| 4,846,038 | A | 7/1989 | Turner | |
| 4,913,024 | A * | 4/1990 | Carriveau | G10H 3/182 84/726 |
| 4,951,543 | A | 8/1990 | Cipriani | |
| 4,981,064 | A | 1/1991 | Vogt | |
| 4,987,816 | A * | 1/1991 | Poor | G10D 3/06 84/314 R |
| 5,198,601 | A | 3/1993 | McCabe | |
| 5,539,147 | A * | 7/1996 | Hoshino | G10H 3/185 84/723 |
| 5,567,894 | A * | 10/1996 | Shiomi | G10D 1/08 84/267 |
| 5,631,432 | A | 5/1997 | Muncy | |
| 5,696,337 | A * | 12/1997 | Hall | G10D 3/06 84/298 |
| 5,756,914 | A | 5/1998 | Streibl | |
| 5,864,073 | A | 1/1999 | Carlson | |
| 5,990,396 | A * | 11/1999 | Lasner | G10D 3/06 84/267 |
| 6,034,308 | A * | 3/2000 | Little | G10D 1/085 84/267 |
| 6,051,765 | A * | 4/2000 | Regenberg | G10D 3/06 84/267 |
| 6,069,306 | A * | 5/2000 | Isvan | G10D 3/06 84/267 |
| 6,111,175 | A | 8/2000 | Lasner | |
| 6,114,618 | A * | 9/2000 | Anke | B23Q 9/02 84/314 R |
| 6,156,961 | A | 12/2000 | Beckmeier | |
| 6,350,940 | B1 | 2/2002 | Upchurch et al. | |
| 6,376,756 | B1 | 4/2002 | Beckmeier | |
| 6,512,168 | B2 | 1/2003 | Cortes | |
| 6,563,037 | B2 | 5/2003 | Hamilton | |
| 7,629,521 | B1 * | 12/2009 | Chapman | G10D 3/06 84/293 |
| 7,659,464 | B1 | 2/2010 | Kokodis | |
| 7,763,786 | B2 * | 7/2010 | Jones | G10D 3/06 84/314 R |
| 7,767,890 | B2 * | 8/2010 | Stein | G10D 1/005 84/267 |
| 7,825,313 | B2 | 11/2010 | Shaffer | |
| 8,153,874 | B2 | 4/2012 | Stockwell | |
| 8,183,447 | B1 * | 5/2012 | Chapman | G10D 3/06 84/293 |
| 8,263,844 | B2 | 9/2012 | Shaffer | |
| 8,324,489 | B1 * | 12/2012 | Chapman | G10D 3/06 84/314 R |
| 8,404,956 | B2 | 3/2013 | Ragas et al. | |
| 8,723,007 | B2 | 5/2014 | Tracy | |
| 8,937,236 | B2 | 1/2015 | Kunstadt | |
| 2002/0050204 | A1 * | 5/2002 | Wilfer | G10D 3/06 84/293 |
| 2003/0140765 | A1 * | 7/2003 | Herman | G10D 3/06 84/314 R |
| 2011/0239841 | A1 * | 10/2011 | Stockwell | G10D 3/06 84/314 R |
| 2012/0090444 | A1 * | 4/2012 | Ragas | G10D 3/06 84/314 R |
| 2013/0255465 | A1 * | 10/2013 | Wilson | G10D 3/18 84/291 |
| 2015/0082966 | A1 * | 3/2015 | Compani-Tabrizi | G10D 3/06 84/314 R |

* cited by examiner

RECESSED CONCAVE FINGERBOARD

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present disclosure relates to musical instruments and particularly stringed instruments and more particularly to a stringed instrument having a concave fingerboard, wherein the concavity is transverse to a longitudinal dimension of the fingerboard and recessed relative to an adjacent portion of a body of the instrument.

2. Description of Related Art

In many stringed instruments, such as guitars, a useful or active length of a vibrating string is adjusted by pressing the string against a fingerboard on the upper surface of the neck. As many notes are played on the instrument, there is multiple contact of the string to the fingerboard. Therefore, the interface between the user and the fingerboard is a factor in the quality and ability to play the instrument.

While many fingerboards are convex to engage the finger of the user, the need still exists for a fingerboard that is more compatible with the structure and movement of the fingers.

BRIEF SUMMARY OF THE INVENTION

In one configuration, a musical instrument is provided having a body having a top surface; a neck extending from the body; a plurality of strings extending along the body and the neck in a longitudinal direction; and a concave fingerboard extending along the longitudinal direction on the neck and the body, the concave fingerboard defining a concave surface perpendicular to the longitudinal direction, wherein the concave surface is symmetrical along the longitudinal direction and at least a portion of the concave surface is recessed relative to an adjacent portion of the body.

In a further configuration, a musical instrument is provided having a plurality of strings extending along a longitudinal direction; and a concave fingerboard extending along the longitudinal direction, the concave fingerboard defining a concave surface perpendicular to the longitudinal direction for contacting the strings, wherein the concave surface is symmetrical about the longitudinal direction and the concave surface has a constant radius of curvature.

Another aspect includes a musical instrument having a body having a top surface; a neck extending from the body; a plurality of strings extending along the body and the neck in a longitudinal direction; a concave fingerboard extending along the longitudinal direction on the neck, the concave fingerboard defining a concave surface perpendicular to the longitudinal direction; and a bridge connected to the body, the bridge including a control surface contacting one of the strings, the control surface being below the top surface of the body.

BRIEF DESCRIPTION OF THE SEVERAL VIEWS OF THE DRAWING(S)

DETAILED DESCRIPTION OF THE INVENTION

The present concave fingerboard can be employed in a variety of stringed instruments. For purposes, of description the concave fingerboard is shown in a guitar. However, it is understood, the assembly can be employed in any stringed instrument. Stringed instruments or string instruments are musical instruments that produce sound from vibrating strings. In most string instruments, the vibrations are transmitted to the body of the instrument, which in acoustic instruments also vibrates, along with the air inside it. Common instruments in the string family include the violin, guitar, sitar, electric bass, viola, cello, harp, double bass, rebab, banjo, mandolin, ukulele, and bouzouki.

Figure 1:
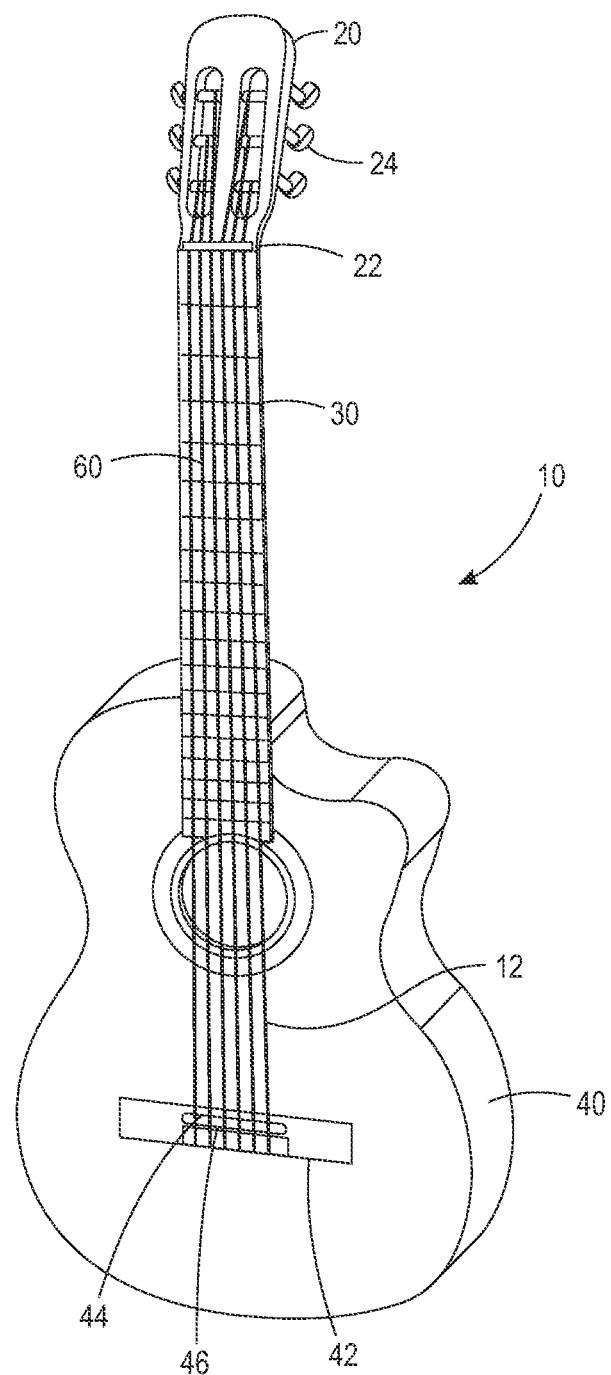
FIG. 1 is a perspective view of a guitar.

Thus, in at least the guitar configuration, as seen in FIG. 1, the stringed instrument 10 includes a head 20 (sometimes referred to as a headstock), a neck 30 and a body 40 supporting a plurality of strings retained in tension.

The head 20 includes a nut 22 and at least one tuner or tuning peg 24.

The nut 22 is a small strip of bone, plastic, brass, graphite, stainless steel, or other medium-hard material, at the joint where the headstock meets the fingerboard. The nut 22 includes a plurality of grooves that guide the strings over the fingerboard, typically giving consistent lateral string placement across the "width" of the fingerboard. In operation, the nut 22 is one of the endpoints of the vibrating length of a string.

The tuner or tuning peg 24 is well known and is connected to a string 12 to provide for the selective adjustment of tension in the string.

The body 40 of the guitar includes a tie block 42 engaging a remaining end of the strings 12. The tie block 42 can often be incorporated into a bridge 44. For purposes of description, the bridge 44 is taken to incorporate the tie block 42. The bridge 44 seats the strings 12 at a given position relative to the fingerboard—at least partly defining the action. Thus, the strings 12 extend from a node at the bridge 44 to a node at the nut 22.

In certain configurations, the bridge 44 supports a saddle 46, wherein the saddle engages the strings 12. The saddle 46 provides the end point for the vibration of the string 12, and on acoustic instruments to transfer the vibrations through the bridge into the top wood of the instrument. The saddle 46 may be one piece (typically on acoustic guitars) or separate pieces, one for each string (electric guitars and basses).

The body 40 includes a top surface 48. In one configuration, the top surface 48 defines a generally planar surface. However, it is understood the top surface 48 can include curved or bowed sections or portions. In some configurations, the top surface 48 can include or mount controls, as well as pads.

The neck 30 is an elongate member interconnecting the body and the headstock. The neck 30 has a longitudinal dimension, or direction, greater than a transverse direction, or width. The longitudinal dimension of the neck 30, typically extends from the headstock 20 to the body 40. Thus, as the strings 12 extend along the neck 30, the strings extend along the longitudinal dimension. It is contemplated the strings may be parallel, converging or diverging as they extend along the longitudinal dimension of the neck between the bridge 44 and the nut 22. The term "string" includes any tensionable material that can be selectively vibrated to produce a tone. In certain configurations, commercially available strings 12 are used.

The neck 30 can have variety of cross sections transverse to the longitudinal dimension. The lateral edges of the neck can be radiused. A back 32 of the neck 30 can have cross sections are often referred to as a gentle "C" curve to a more pronounced "V" curve.

The neck 30 thus has a cross section at each point along the longitudinal dimension, wherein the cross section is transverse to the longitudinal dimension. That is, the cross section is taken transverse to the longitudinal direction. A cross sectional center of mass is the location of the center of mass within a given cross section of the neck.

A center line is defined as a vertical line orthogonal to the longitudinal dimension and passing through the center of the neck at a given cross section of the neck and passing through the fingerboard and the back of the neck.

The neck 30 resists the bending stress from the tension in the strings 12 between the body 40 (bridge 44) and the headstock 20 (nut). Many guitars include a truss rod extending along at least a length of the neck. The truss rod can be a metal rod extending along an inside of the neck. The truss rod counteracts the bending force on the neck 30 that is generated from the tension the strings, thereby returning or retaining the neck to a straight or straightened position. The truss rod can also be used to correct changes to a curvature of the neck caused by the neck timbers aging, changes in humidity as well as to compensate for changes in the tension of strings. Adjusting the truss rod affects the intonation of a guitar as well as the action (the height of the strings from the fingerboard).

As seen in FIGS. 2-4, 10-12, 15 and 19, the neck 30 includes a concave fingerboard 60. The fingerboard 60 is the surface against which the strings 12 are selectively stopped to change the vibrating length and hence pitch of the vibrating string. The fingerboard 60 extends along the longitudinal dimension and is defined by opposing lateral edges 62, 66 extending along the longitudinal dimension. Thus, the lateral edges 62, 66 extend along the longitudinal dimension. It is contemplated the lateral edges 62, 66 may be parallel, converging or diverging as they extend along the longitudinal dimension of the neck 30.

In certain configurations, the fingerboard 60 is a thin, long strip of material, usually wood, that is connected to such as laminated to the front of the neck 30. The strings 12 run over the fingerboard 60, between the nut 22 and the bridge 44. For purposes of description, the fingerboard 60 encompasses the separate material or the neck 30 defining the surface contacted by the user.

The fingerboard 60 is also known as a fretboard on fretted instruments, such as guitars. In guitars, the fingerboard 60 includes a plurality of frets 70 spaced along the length of the fingerboard. The frets 70 are raised strips of hard material generally perpendicular to the strings 12, which the player presses the strings against to stop the strings. Frets 70 may be fixed, as on a guitar or mandolin, or movable, as on a lute. Fingerboards 60 may also be, though uncommon, a hybrid of these two. Such a construction is seen on the sitar, where arched frets 70 attach at the edges of a smooth fingerboard; unfrettable strings run inside the frets, while frettable ones run outside. In an alternative structure, the fret 70 is a piece of material, such as a string, tied or retained around the neck.

Figure 2:
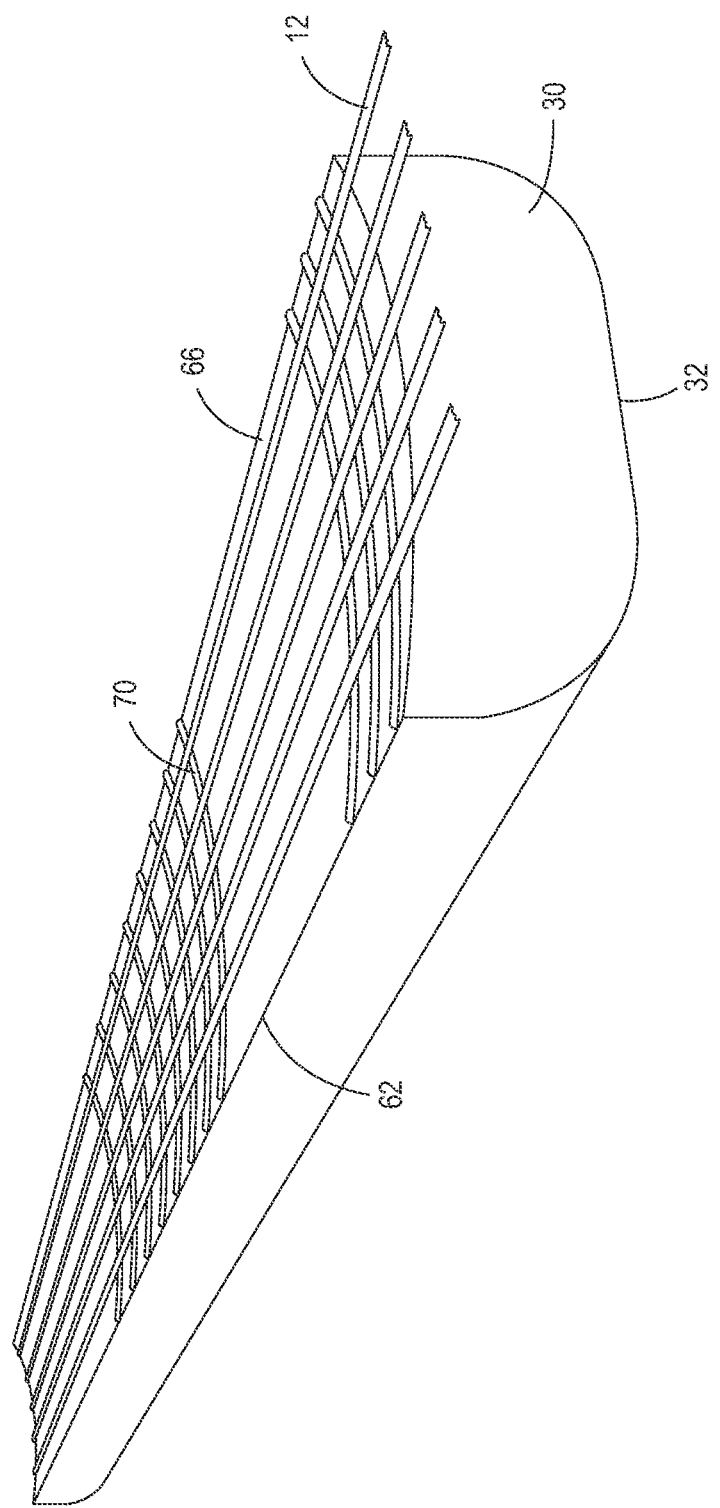
FIG. 2 is a perspective view of a neck and concave fingerboard.
Figure 3:
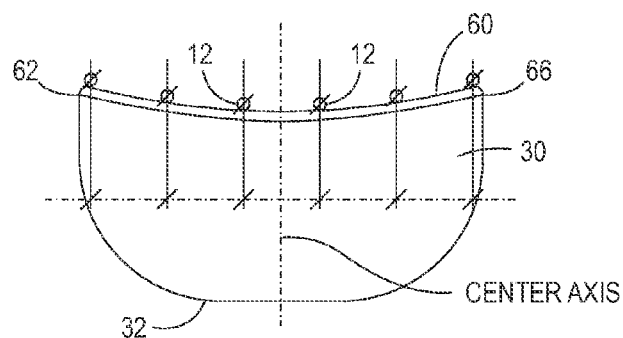
FIG. 3 is a cross sectional view of the concave fingerboard.

Referring to FIGS. 2 and 3, the present assembly includes the concave fingerboard 60, wherein for each cross section of the concave fingerboard transverse to the longitudinal dimension, the cross section is concave. That is, concave fingerboard 60 is concave relative to a plane extending between the lateral edges 62, 66 of the fingerboard. The concave surface is perpendicular to the longitudinal dimension of the strings 12. The concave surface extends longitudinally along the longitudinal dimension between the lateral edges 62, 66 of the fingerboard 60. As seen in FIGS. 2 and 3, the concave fingerboard 60 thus has a width W defined by the lateral edges 62, 66 and a depth D defined by the amount of recess or depression a plane encompassing the lateral edges.

The concave fingerboard 60 can define substantially the entire width of the neck 30 between the lateral edges 62, 66, as seen in FIGS. 2, 3, 9, 10, 11, 14, 18, 19 and 21. The concave fingerboard 60 has a central axis that extends along the longitudinal axis, wherein in select configurations, the concavity is symmetrical about the central axis along at least a majority and in certain configurations a substantially the entire length of the concave fingerboard.

It is contemplated the concave surface can be described as a concavity. Specifically, the concavity includes the depth of the concave surface and the radius of curvature that provides for the fingerboard 60 being concave relative to a plane extending between the lateral edges 62, 66. For example, the concavity can be the amount of depression or depth relative to, or spacing from, a plane encompassing the lateral edges 62, 66 of the fingerboard 60. The concavity is seen in the cross section of the concave fingerboard 60 taken transverse to the longitudinal dimension. In certain configurations, the concavity is defined by a central axis extending along the longitudinal dimension, wherein the central axis is the deepest part of the concavity. The central axis can be vertically aligned with a center axis of the neck 30, when viewed from above the fingerboard 60. The concave surface forming the fingerboard 60 is longer (extending along the longitudinal dimension than it is wide.

Figure 4:
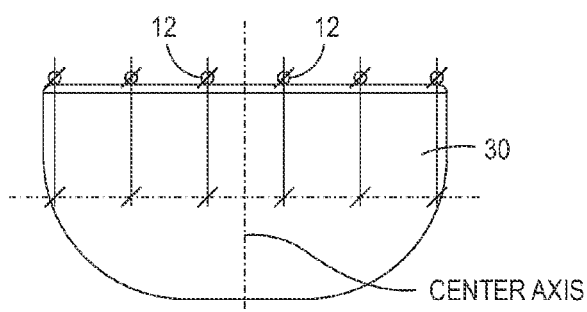
FIG. 4 is a cross sectional view of a flat fingerboard.
Figure 5:
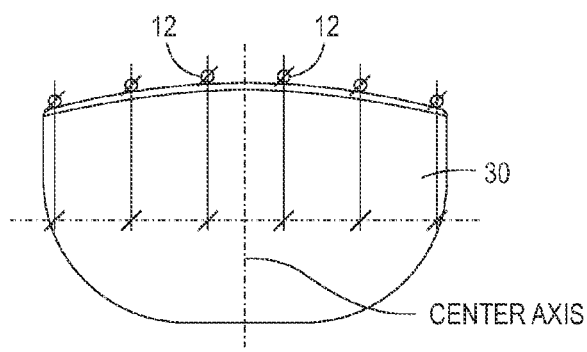
FIG. 5 is a cross sectional view of a convex fingerboard.

Referring to FIGS. 2 and 3, showing the concave cross section, the strings 12 along the lateral edges 62, 66 of the fingerboard 60 are further spaced from the center axis of the neck 30 than those strings nearer the central axis of the fingerboard. Referring to FIG. 4, in a flat fingerboard, the distance between the strings 12 and the center axis increases as the strings near the lateral edges of the neck. As seen in FIG. 5, for a convex fingerboard, the central strings are spaced further from the center axis of the fingerboard than in the flat fingerboard or the convex fingerboard.

The concave fingerboard 60 is symmetrical along its length and may be of varying depth. Thus, the concave surface can have a first radius of curvature at a first location along the longitudinal dimension and the same radius of curvature at a different second location along the longitudinal dimension. In one configuration, the concave fingerboard 60 is symmetrical about the longitudinal axis. That is, the concave fingerboard 60 has a substantially equal radius of curvature across the cross section.

Referring to FIGS. 19, 21 22, 23, 24 and 25 at least a portion of the concave fingerboard lies below an adjacent portion of the top surface 48 of the body 40. In one configuration, the entire concavity of the fingerboard 60 is below the plane of the top surface 48 of the body 40 of the instrument 10. In a further configuration, a majority, either by volume or surface area of the concavity lies below the plane of the top surface 48.

The bridge 44, the saddle 46 and the nut 22 are correspondingly shaped relative to the concave fingerboard 60 to define the desired action. That is, at least one, and in select configurations both the nut 22 and the saddle 46 are concave. Thus, the action for the concave fingerboard 60 can mimic traditional convex or flat fingerboards. It is also understood the bridge 44, the saddle 46 and the nut 22 can be configured for a given concave fingerboard 60 to provide a different action than a convex fingerboard.

Further, as seen in FIGS. 22, 23, 24 and 25, the bridge can be a negative bridge in that it has the concave profile matching the concave fingerboard 60 and is at least partly disposed below the adjacent surface top surface 48 of the body 40.

The bridge 44 can include mechanisms for raising or lowering the bridge saddles to adjust the action (the distance between the strings and the fingerboard/fretboard), or fine-tuning the intonation of the instrument. The bridge can be a substantially integrated unit that moves as a single piece.

Figure 22:
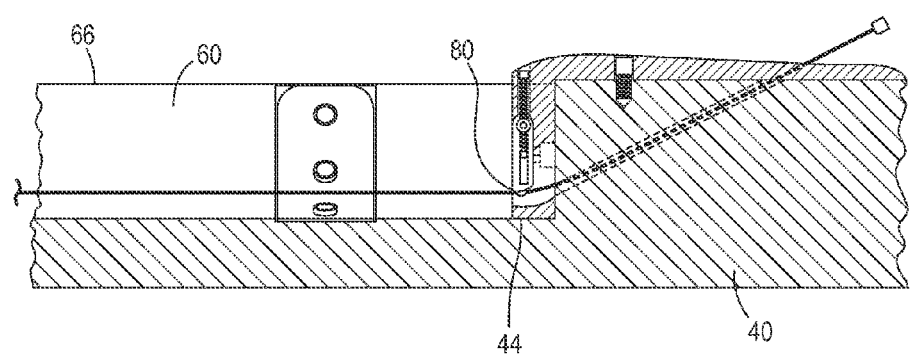
FIG. 22 is a side elevation view of a first configuration of a bridge for strings extending below a top surface of an instrument body.

Alternatively, the bridge 40 can include individual control surfaces 80, wherein each string 12 contacts a corresponding control surface and the control surface can be independently moveable for the corresponding string. The control surface 80 defines the point, or area, of contact between the respective string and the bridge. Specifically, as seen in FIG. 22, each control surface 80 can be moved along the longitudinal dimension of the string 12 as well as generally perpendicular to the plane of the fingerboard 60, thereby changing the action. Movement of the respective control surface 80 can be by threaded screws or bolts. Alternatively, cams or linear actuators can be employed to move the respective control surface 80. Although the end of the string 12 is shown as an anchor ball, it is understood the string can pass through from the control surface.

Figure 23:
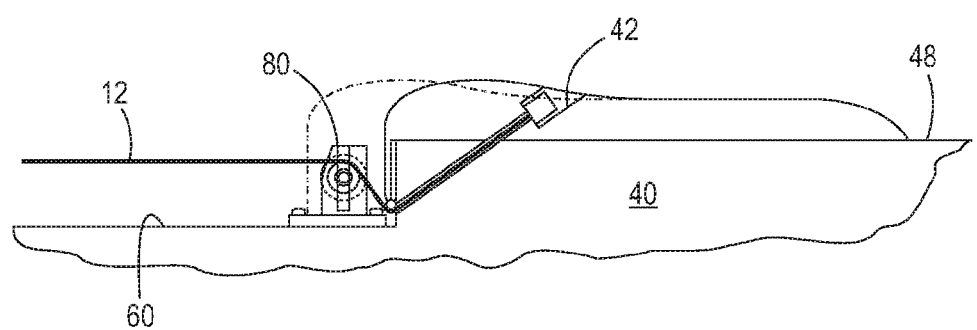
FIG. 23 is a side elevation view of a second configuration of a bridge for strings extending below a top surface of an instrument body.

Referring to FIG. 23, an alternative configuration of the bridge 44 is shown. In this configuration, the string 12 runs over the control surface 80 then under a guide, wherein the end of the string can be captured with an anchor ball end or to the tailpiece accessible to the top surface 48.

Figure 24:
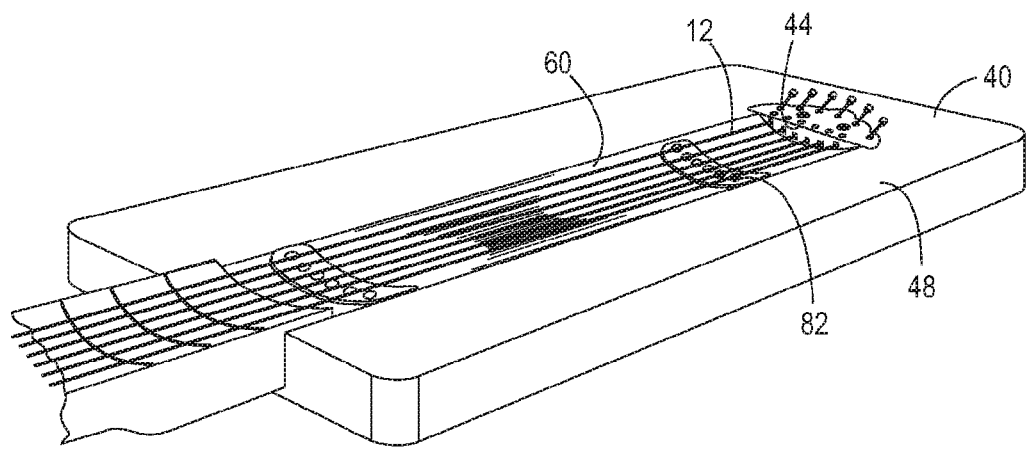
FIG. 24 is a perspective view of the concave fingerboard recessed relative to an adjacent portion of the body of the instrument showing an alternative negative bridge configuration along with pick-ups.

FIG. 24 discloses the recessed concave fingerboard, wherein the bridge 44 and pickups 82 are recessed and have a curvature of the recessed fingerboard.

Figure 25:
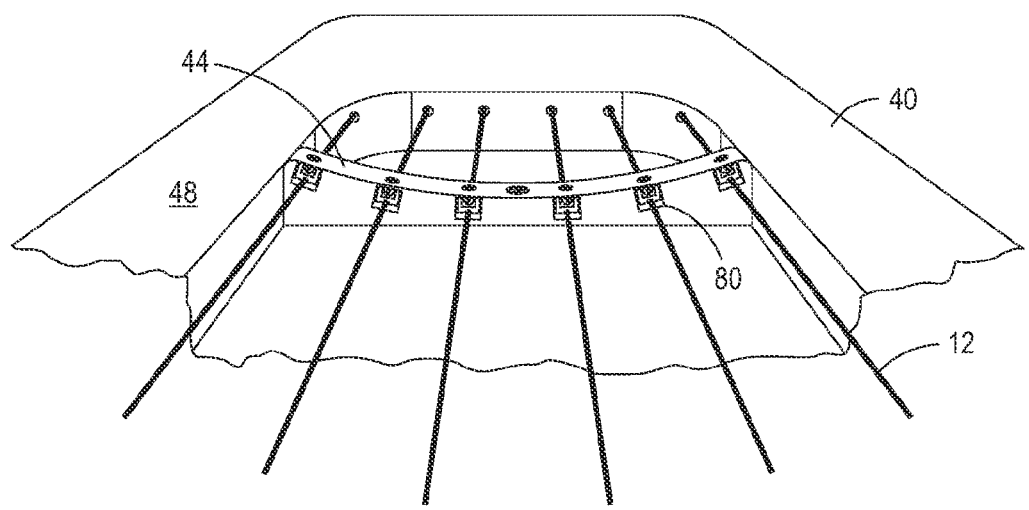
FIG. 25 is a perspective view of a concave fingerboard with a negative bridge.
Figure 26:
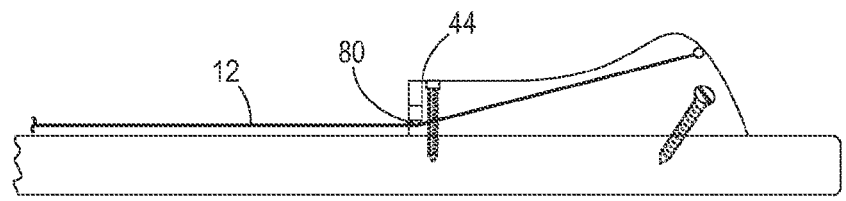
FIG. 26 is cross sectional view of the concave fingerboard and negative bridge of FIG. 25.

In FIGS. 25 and 26, the control surface 80, with adjustment mechanism for adjustment along the longitudinal direction and perpendicular to the longitudinal direction (in the form of screws) is shown. The strings 12 thus lie along an arcuate path having the curvature of the concave fingerboard 60.

To play the instrument, a musician presses a string or strings 12 against the fingerboard 60 to change the vibrating length of the string, thereby changing the pitch. It is believed the concave fingerboard 60 provides an improved structure by which a theoretical musical scale may be transposed upon the fingerboard 60, by placing laterally along its length at predetermined intervals, a marking or protruding material, such as a fret 70, or both or none, by which a tensionable material, such as a string, is stretched to the desired pitch, may be pressed against the concave surface at the desired interval or protrusion, to produce an expected tone.

Figure 20:
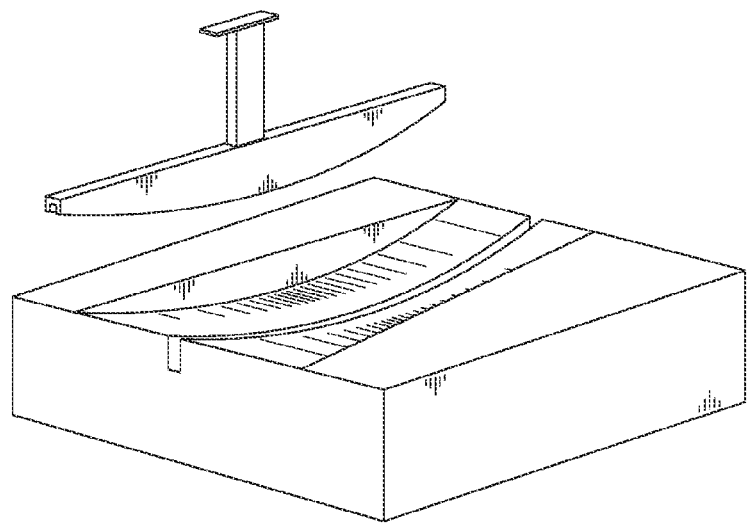
FIG. 20 is a perspective view of a jig for forming a concave fret.
Figure 21:
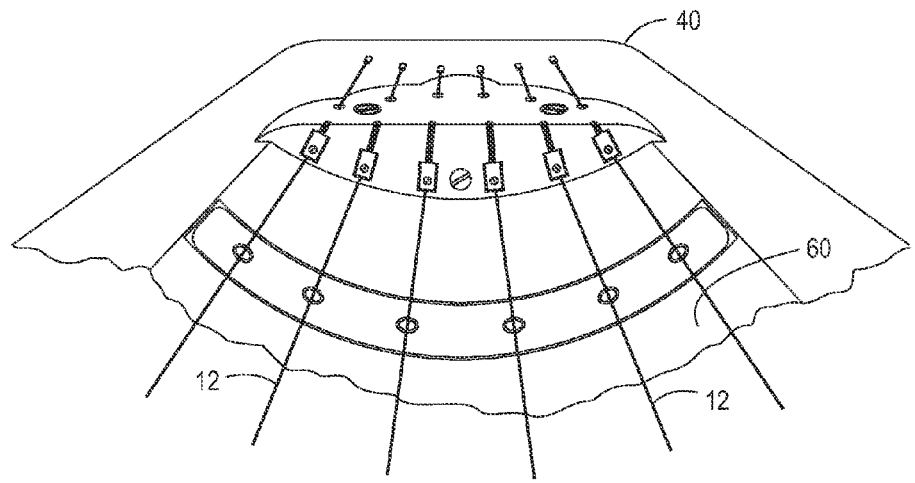
FIG. 21 is a perspective end view of a bridge for strings in a recessed concave fingerboard.

As seen in the Figures, the frets 70 are concave follow the surface of the fingerboard 60. The frets 70 typically include a tang and a rounded exposed portion for contacting the string. The tang extends below the of the contact portion of the fret. In contrast to traditional convex frets in which the tang partly overlaps to generate a retention force with the fingerboard 60, the present frets 70 are pre-shaped, such as by jig shown in FIG. 20, prior to installation to compensate for the concave curvature precluding the retention force from the tang overlap. In addition, the slots in the fingerboard 60 are undersized compared to those in traditional fingerboards. In one configuration, the amount of undercut is approximately 0.001 inches.

Figure 6:
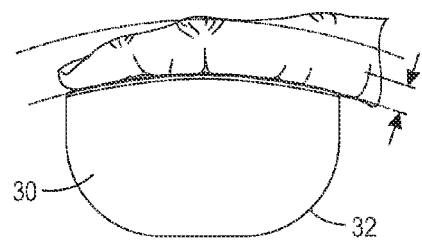
FIG. 6 is a cross sectional view of a convex fingerboard with a finger contacting the fingerboard.
Figure 7:
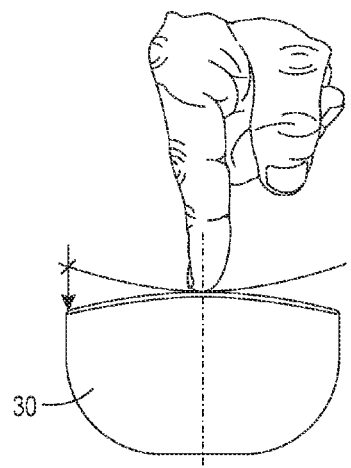
FIG. 7 is a cross sectional view of a convex fingerboard showing an arc of travel of a fingertip with respect to the convex fingerboard.
Figure 8:
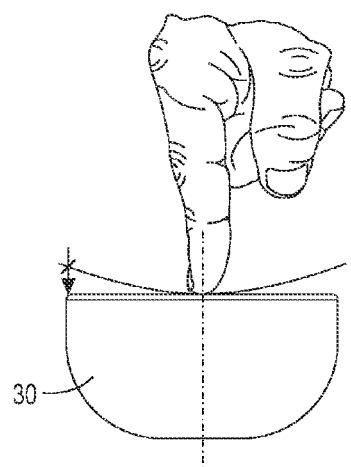
FIG. 8 is a cross sectional view of a flat fingerboard showing an arc of travel of a fingertip with respect to the flat fingerboard.

In a traditional convex fingerboard, the finger must apply pressure on the inner surface of the curved finger, shown in FIG. 6 or the natural sweep (or rotation) of the fingertip track is away from the strings nearer the lateral edges, FIG. 7. Similarly, as seen in FIG. 8, for a flat fingerboard the natural sweep (or rotation) of the fingertip takes the fingertip away from the strings nearer the lateral edges.

Figure 9:
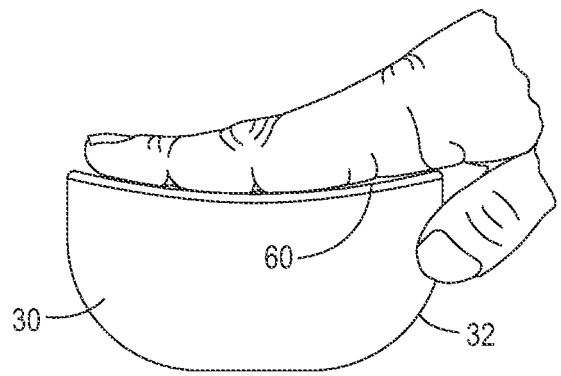
FIG. 9 is a cross sectional view of the concave fingerboard with a finger contacting the concave fingerboard.
Figure 10:
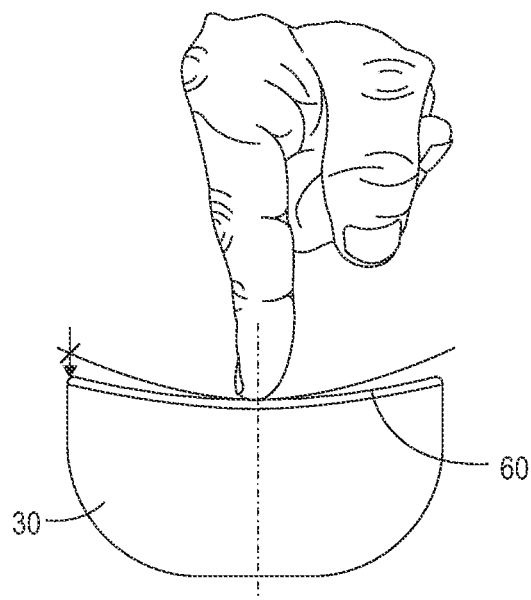
FIG. 10 is a cross sectional view of the concave fingerboard showing an arc of travel of a fingertip with respect to the concave fingerboard.

Referring to FIGS. 9 and 10, the longitudinal concave fingerboard 60 improves the accessibility of the human hand to strum, pick, pluck, chord, slide, or depress singularly, wholly and or by individual finger, by matching the concave radius of the concave fingerboard to the natural rotation of the fingers, wrist, arm and shoulder along their respective joints.

Figure 11:
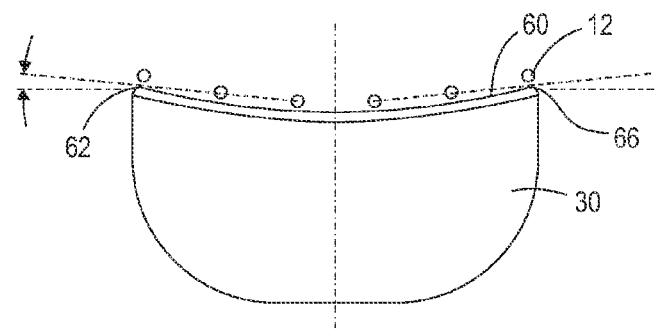
FIG. 11 is a cross sectional view of the concave fingerboard showing an arc of sound waves intersecting the concave fingerboard.
Figure 12:
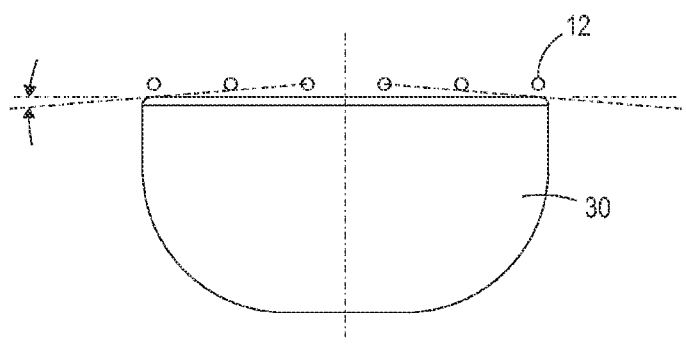
FIG. 12 is a cross sectional view of the flat fingerboard showing an arc of sound waves intersecting the flat fingerboard.
Figure 13:
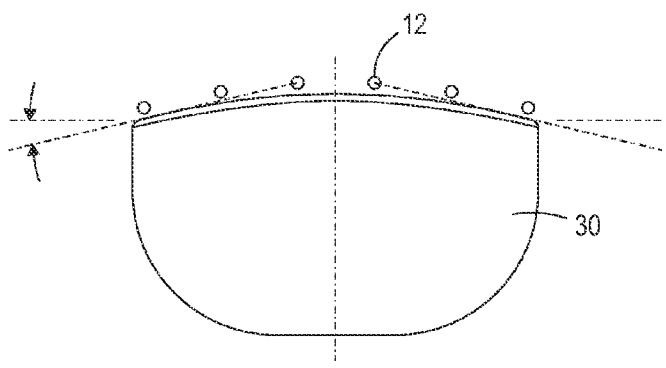
FIG. 13 is a cross sectional view of the convex fingerboard showing an arc of sound waves intersecting the convex fingerboard.
Figure 14:
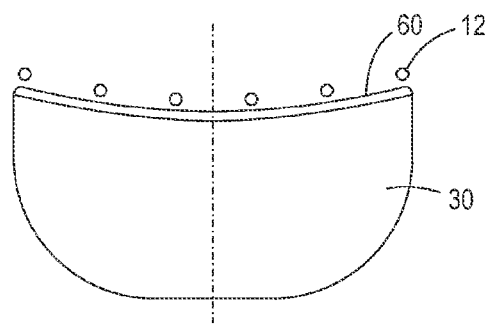
FIG. 14 is a cross sectional view of the concave fingerboard showing the string location relative to the center of the neck having the concave fingerboard.
Figure 15:
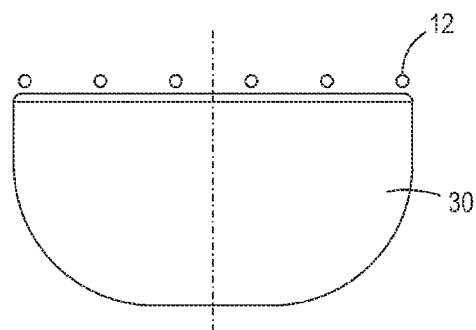
FIG. 15 is a cross sectional view of the flat fingerboard showing the string location relative to the center of the neck having the flat fingerboard.
Figure 16:
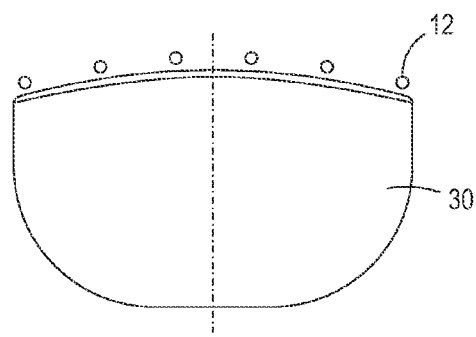
FIG. 16 is a cross sectional view of the convex fingerboard showing the string location relative to the center of the neck having the convex fingerboard.

It is believed the longitudinal concave fingerboard 60 improves the sustainability of the strings 12 vibrations along the fingerboard, neck, body, and any component so affixed as to be considered integral to the structure. By allowing the strings 12 to be so adjusted, that they can be lowered below the flat plane described by the lateral edges 62, 66 of the concave fingerboard 60. As seen in FIG. 11, by lowering the strings within the concavity, a larger proportion of the strings radially emanating sound waves intersect the surface of the fingerboard 60. This allows a greater portion of the sound wave from the string to be captured by the fingerboard, thus providing a longer sustained and louder string vibration. As seen in FIG. 12 for a flat fingerboard, a reduced arc, as compared to the convex fingerboard, of the sound waves from a vibrating string intersect the fingerboard. Referring to FIG. 13 for a convex fingerboard, the arc of sound waves intersecting the fingerboard is less than the flat fingerboard, which is turn is less than the convex fingerboard as seen in through FIGS. 11-13.

The concavity of the fingerboard 60 will allow for the center plane of the forces of the accumulative tension of the strings 12, to be materially closer to the center of mass of the neck 30. By reducing the incongruent strain and tension of the strings 12 on the neck 30, it is believed to provide an improved mechanical advantage in the linear strength of the neck, reducing the tendency of the neck to bow, twist or warp, in response to the pull of the strings along one side of the neck. In one configuration, a majority of the plurality of strings extends along the concave fingerboard below the plane spanning the lateral edges 62, 66.

The concave fingerboard 60 having the concavity will allow for the innate convex curvature of the outstretched human finger(s) to fit more completely against fingerboard when depressing the strings. Thus, the force required to counter the resistance of the tensioned strings 12 and engage the fingerboard 60 is greatly reduced, decreasing fatigue while providing greater control and hence improved performance.

Figure 17:
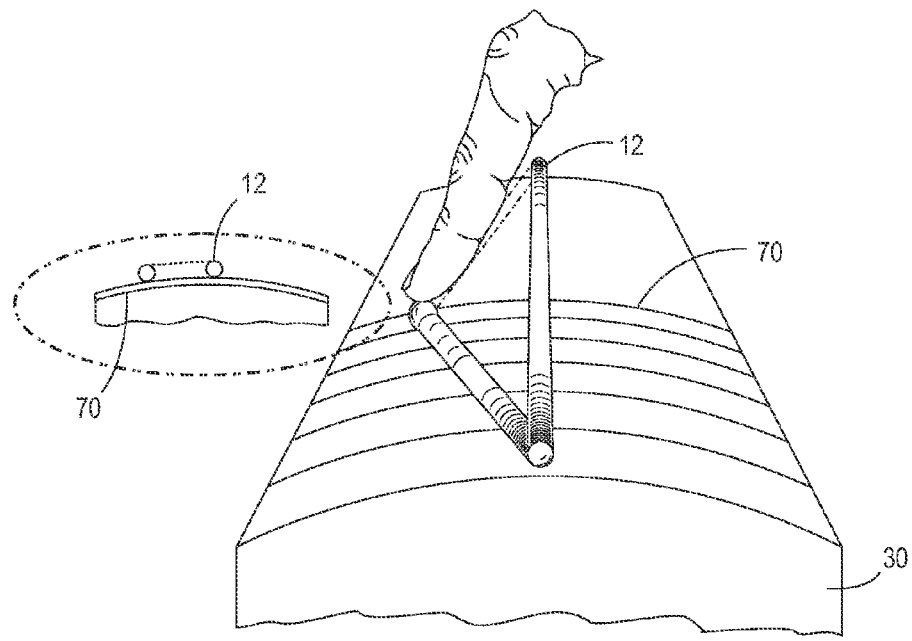
FIG. 17 is a cross sectional view of the string moving across a fret on the convex fingerboard, with the enlarged section showing contact of the string with another fret.

The concave fingerboard 60, and particularly the fingerboard having a constant radius of curvature will eliminate an inherent flaw of convex fingerboards by eliminating a phenomenon called "fretting". Referring to FIG. 17, in a convex fingerboard, as the finger pushes against fingerboard, then slides the string 12 parallel to the fret, and perpendicular to the fingerboard length (the longitudinal dimension), and over the crown of the convex, to raise the pitch, the clearances to the forward adjacent frets decreases. The string will undesirably come in contact with the closer forward (nearer the bridge 44) adjacent fret tops or fingerboard, thus muting the vibration of the string, and rendering the tone inaudible.

Figure 18:
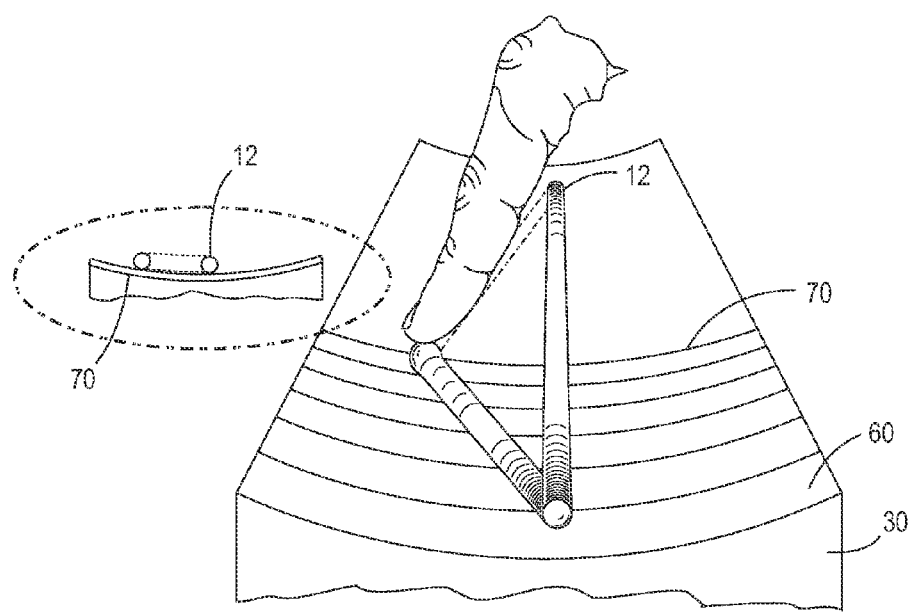
FIG. 18 is a cross sectional view of the string moving across a fret on the concave fingerboard, with the enlarged section showing a spacing of the string with another fret.
Figure 19:
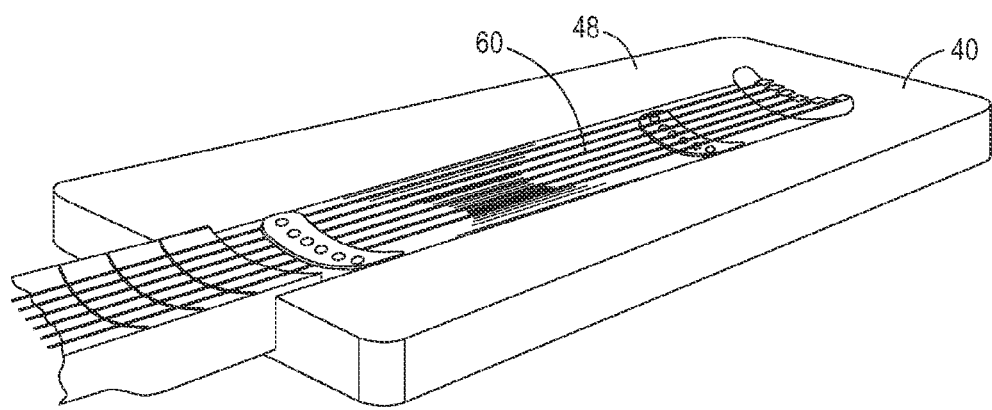
FIG. 19 is a perspective view of the concave fingerboard recessed relative to an adjacent portion of the body of the instrument.

As seen in FIG. 18, the concave fingerboard 60 will have the reverse effect when a string or strings 12 are slid perpendicular to their length to raise the pitch. Specifically, due to the shape of the concave fingerboard 60, the string 12 will gain clearance over the forward (nearer the bridge) frets 70 and the fingerboard, thereby reducing to completely eliminating the unwanted effect of two or more frets or portions of the fingerboard simultaneously contacting a string or strings.

Thus, the instrument 10 can be described as the neck 30 having a longitudinal axis, a cross sectional center of mass at a given position along the longitudinal axis and a vertical center line normal to the longitudinal axis; and a plurality of strings 12 extending along the longitudinal axis, the plurality of strings including a first string and a second string, wherein the first string is nearer to both the center line and the cross sectional center of mass of the neck 30 than the second string at the given position along the longitudinal axis.

Alternatively, the instrument 10 can be described as a plurality of strings 12 extending along a longitudinal direction; and a fingerboard 60 extending along the longitudinal direction, the fingerboard having a cross sectional profile extending along a majority of the length of the fingerboard, the cross section profile selected to intersect a greater angle of sound waves from a vibrating one of the strings than a planar fingerboard.

In a further description, the instrument includes a plurality of strings 12 extending along a longitudinal direction; and a fingerboard 60 extending along the longitudinal direction, the fingerboard having a cross sectional profile selected to have a reduced wave dispersal compared to a planar fingerboard.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims. While the system has been described in connection with a presently disclosed configurations thereof, those skilled in the art will recognize that many modifications and changes made be made therein without departing from the true spirit and scope, which accordingly is intended to be defined solely by the appended claims.

The invention claimed is:

1. A musical instrument comprising:
 (a) a body having a top surface;
 (b) a neck extending from the body;
 (c) a plurality of strings having a vibration length extending along the body and the neck in a longitudinal direction; and
 (d) a concave fingerboard extending along the longitudinal direction on the neck and the body, the concave fingerboard defining a concave surface, the concave surface having a depth laterally bounded by higher opposing edges, the opposing edges being substantially parallel to the longitudinal direction, wherein the concave surface is symmetrical along the longitudinal direction and at least a portion of the concave surface extending along the body is recessed relative to an adjacent portion of the body.

2. The instrument of claim 1, wherein the concave surface has a constant radius of curvature.

3. The instrument of claim 1, wherein a depth of the concave surface changes along the longitudinal direction of the concave fingerboard.

4. The instrument of claim 1, further comprising a bridge engaging the plurality of strings, at least a portion of the bridge recessed relative to an adjacent portion of the top surface to locate a portion of the vibration length of at least one of the plurality of strings adjacent the bridge below the top surface of the body.

5. The instrument of claim 1, further comprising a bridge engaging the plurality of strings, wherein the bridge locates a portion of the vibration length of at least one string below an adjacent portion of the top surface.

6. A musical instrument comprising:
(a) a plurality of strings extending along a longitudinal direction; and
(b) a concave fingerboard extending along the longitudinal direction, the concave fingerboard defining a concave surface such that a cross section of the fingerboard transverse to the longitudinal direction defines the concave surface having a maximum depth within a radius of curvature for contacting the strings, wherein the concave surface is symmetrical about the longitudinal direction and the radius of curvature is constant.

7. The instrument of claim 6, further comprising a body having a top surface, wherein at least a portion of the concave fingerboard lies below an adjacent portion of the top surface.

8. The instrument of claim 7, further comprising a bridge engaging the plurality of strings, a portion of the bridge being below an adjacent portion of the top surface.

9. The instrument of claim 6, wherein a depth of the concave surface changes along the longitudinal direction of the concave fingerboard.

10. A musical instrument comprising:
(a) a body having a top surface;
(b) a neck extending from the body;
(c) a plurality of strings having a vibration length extending along the body and the neck in a longitudinal direction, the plurality of strings including a first string intermediate a second string and a third string, the second string and the third string disposed in a plane;
(d) a concave fingerboard extending along the longitudinal direction on the neck, the concave fingerboard defining a concave surface extending along the longitudinal direction; and
(e) a bridge connected to the body, the bridge including a control surface contacting one of the strings, the control surface being below the top surface of the body to locate a portion of the vibration length of at least one string below the top surface of the body, and the bridge disposing the first string being outside the plane.

11. The musical instrument of claim 10, wherein a portion of the concave fingerboard is below the top surface of the body.

12. The musical instrument of claim 10, wherein the control surface is adjustable.

\* \* \* \* \*